United States Patent
Grand

(10) Patent No.: US 10,182,036 B2
(45) Date of Patent: Jan. 15, 2019

(54) METHOD AND EQUIPMENT FOR ESTABLISHING A CONNECTION THROUGH A VIRTUAL PRIVATE NETWORK

(71) Applicant: Jean-Yves Grand, Orvault (FR)

(72) Inventor: Jean-Yves Grand, Orvault (FR)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 13/261,894

(22) PCT Filed: Nov. 8, 2012

(86) PCT No.: PCT/EP2012/072127
§ 371 (c)(1),
(2) Date: May 14, 2014

(87) PCT Pub. No.: WO2013/072245
PCT Pub. Date: May 23, 2013

(65) Prior Publication Data
US 2014/0298446 A1    Oct. 2, 2014

(30) Foreign Application Priority Data

Nov. 14, 2011  (EP) .................................. 11290522

(51) Int. Cl.
*G06F 21/00* (2013.01)
*H04L 29/06* (2006.01)
(Continued)

(52) U.S. Cl.
CPC ...... *H04L 63/0272* (2013.01); *H04L 12/4633* (2013.01); *H04L 12/4641* (2013.01); *H04L 45/302* (2013.01); *H04W 28/24* (2013.01)

(58) Field of Classification Search
None
See application file for complete search history.

(56) References Cited

U.S. PATENT DOCUMENTS

| | | | |
|---|---|---|---|
| 6,912,232 B1 * | 6/2005 | Duffield | H04L 12/4641 370/231 |
| 7,197,048 B1 * | 3/2007 | Duffield | H04L 12/4641 370/231 |

(Continued)

FOREIGN PATENT DOCUMENTS

| | | |
|---|---|---|
| CN | 1649320 A | 8/2005 |
| EP | 1 708 408 A1 | 10/2006 |

(Continued)

OTHER PUBLICATIONS

Lars Volker et al., "Introducing QoS mechanisms into the IPsec packet processing," 32$^{nd}$ IEEE Conference on Local Computer Networks, pp. 360-367, XP031153073, Oct. 1, 2007.

(Continued)

*Primary Examiner* — Maung T Lwin
(74) *Attorney, Agent, or Firm* — Fay Sharpe LLP

(57) ABSTRACT

Embodiments of the present invention refer to a method for establishing a connection through a virtual private network "VPN" (9) between a first (1) and a second (3) entities of a transport network, the entities including a VPN interface (5, 7), wherein, between the interfaces, a bearer of a selected type, among a plurality of types corresponding to a plurality of quality of service "QoS", is determined according to the QoS requested for the connection and wherein the parameters used by the VPN interfaces (5, 7) for the establishment of the bearer are global routing parameters corresponding to global routing parameters of the transport network and wherein the parameters include at least one parameter which is different from one bearer type to another so that the selected bearer type associated with the QoS requested for the connection is identified by the first and the second entities.

6 Claims, 4 Drawing Sheets

(51) Int. Cl.
*H04L 12/46* (2006.01)
*H04L 12/725* (2013.01)
*H04W 28/24* (2009.01)

(56) References Cited

U.S. PATENT DOCUMENTS

| | | | |
|---|---|---|---|
| 7,421,487 B1* | 9/2008 | Peterson et al. | 709/223 |
| 7,747,728 B1* | 6/2010 | Peterson | H04L 12/2602 |
| | | | 709/223 |
| 7,933,274 B2* | 4/2011 | Verma | H04L 41/5003 |
| | | | 370/235 |
| 8,244,242 B2* | 8/2012 | Zhang | H04W 8/26 |
| | | | 370/328 |
| 8,612,612 B1* | 12/2013 | Dukes | H04L 67/14 |
| | | | 370/230 |
| 8,862,869 B1* | 10/2014 | Soon | H04L 63/0428 |
| | | | 713/153 |
| 2002/0191541 A1* | 12/2002 | Buchanan | H04L 12/4641 |
| | | | 370/230 |
| 2005/0088977 A1 | 4/2005 | Roch et al. | |
| 2007/0038751 A1* | 2/2007 | Jorgensen | 709/226 |
| 2007/0259673 A1* | 11/2007 | Willars | H04W 52/0225 |
| | | | 455/453 |
| 2008/0172732 A1* | 7/2008 | Li et al. | 726/15 |
| 2008/0219254 A1* | 9/2008 | Haney | 370/389 |
| 2009/0225762 A1 | 9/2009 | Davidson et al. | |
| 2009/0231999 A1* | 9/2009 | Verma et al. | 370/235 |
| 2009/0232019 A1* | 9/2009 | Gupta | H04L 12/287 |
| | | | 370/252 |
| 2009/0318147 A1* | 12/2009 | Zhang | H04W 8/26 |
| | | | 455/435.1 |
| 2011/0058479 A1* | 3/2011 | Chowdhury | H04L 45/04 |
| | | | 370/237 |
| 2011/0075675 A1* | 3/2011 | Koodli | H04L 12/14 |
| | | | 370/401 |
| 2012/0033663 A1* | 2/2012 | Guichard | H04L 45/02 |
| | | | 370/389 |
| 2012/0063450 A1* | 3/2012 | Pignataro et al. | 370/389 |
| 2012/0082073 A1* | 4/2012 | Andreasen | H04L 12/4633 |
| | | | 370/310 |
| 2012/0082093 A1* | 4/2012 | Andreasen | H04L 12/4633 |
| | | | 370/328 |
| 2012/0092992 A1* | 4/2012 | Pappas et al. | 370/235 |
| 2012/0106507 A1* | 5/2012 | Venkataswami | H04L 45/50 |
| | | | 370/331 |
| 2012/0173661 A1* | 7/2012 | Mahaffey | H04L 67/14 |
| | | | 709/217 |
| 2012/0281540 A1* | 11/2012 | Khan | H04L 45/308 |
| | | | 370/241 |
| 2013/0028075 A1* | 1/2013 | Agulnik | H04W 76/19 |
| | | | 370/221 |
| 2013/0054763 A1* | 2/2013 | Van der Merwe et al. | 709/220 |

FOREIGN PATENT DOCUMENTS

| | | |
|---|---|---|
| JP | 2008-311974 A | 12/2008 |
| JP | 2011-091796 | 5/2011 |

OTHER PUBLICATIONS

Samsung, "QoS control for S2b," 3rd Generation Partnership Project (3GPP), 3GPP TSG SA WG2 Architecture—S2 #61, S2-075265, pp. 1-3, XP050261974, Ljubljana, Slovenia, Nov. 12-16, 2007.

Jeremy De Clercq Alcatel, "QoS considerations for L3 PPVPNs <draft-declercq-ppvpn-l3vpn-qos-00.txt>," Network Working Group, pp. 1-15, Feb. 1, 2003.

International Search Report for PCT/EP2012/072127 dated Feb. 20, 2013.

Lars Voelker, et al.; Introducing QoS mechanisms into the IPsec packet processing, 2007 IEEE (9 pages).

\* cited by examiner

METHOD AND EQUIPMENT FOR ESTABLISHING A CONNECTION THROUGH A VIRTUAL PRIVATE NETWORK

BACKGROUND

The present invention relates to the field of the communication network and more particularly to the management of virtual private networks (VPN).

A virtual private network (VPN) refers to a network using existing communication infrastructures of a transport network, to provide a secured connection between remote entities by establishing a tunnel over the existing communication infrastructures to connect the entities and transfer encrypted data. FIG. 1 represents the establishment of a virtual private network between a first entity 1 and a second entity 3 of a transport network. Both entities are located in remote locations. The first entity comprises a VPN interface 5 and the second entity comprises a VPN interface 7. Thus, if the first entity 1 wants to establish a connection with the second entity 3 and therefore transfers data packets between the Internet protocol (IP) addresses of both entities, a VPN 9 corresponding to a secured tunnel is then established between the first 5 and the second 7 VPN interfaces in order to encapsulate the transmitted data packets of the IP stream 11. The encrypted data packets of the VPN 9 are then transmitted by the transport network 13 between both VPN interfaces 5 and 7.

Besides, with some communication standards, such as long term evolution (LTE), a quality of service (QoS) can be requested when a connection is established in order to have enough resources reserved to ensure the desired QoS for the connection. Thus, different, types of bearers associated with different QoS are defined and a bearer of a selected type is established according to the required QoS.

However, in the state of the art, a virtual private network ensures only a secured transmission between a source and a destination but does not provide features of the transmission such as the used bearer to the transport network entities located at both ends of the VPN. As a consequence, there is no possibility, for the transport network entities to differentiate different bearers and therefore to use differentiated QoS while using a virtual private network of the state of the art.

SUMMARY

It is therefore an object of embodiments of the present invention to provide a solution allowing to combine a differentiated QoS feature with the features offered by a virtual private network.

Thus, embodiments of the present invention refer to a method for establishing a connection through a virtual private network "VPN" between a first and a second entities of a transport network, the said entities comprising a virtual private network "VPN" interface, wherein, between the said interfaces, a bearer of a selected type, among a plurality of types corresponding to a plurality of quality of service "QoS", is determined according to the quality of service "QoS" requested for the connection and wherein the parameters used by the virtual private network "VPN" interfaces for the establishment of the bearer are global routing parameters corresponding to global routing parameters of the transport network and wherein the said parameters comprise at least one parameter which is different from one bearer type to another so that the selected bearer type associated with the quality of service "QoS" requested for the connection is identified by the first and the second entities.

According to an additional aspect of embodiments of the present invention, the connection comprises the transmission of packets between the first and the second entities and wherein the global routing parameters of the virtual private network "VPN" corresponding to global routing parameters of the transport network are used to route the packets of the connection towards a bearer of a selected type corresponding to the quality of service "QoS" requested for the connection.

According to another aspect of embodiments of the present invention, the virtual private network "VPN" between a first and a second entities comprises the establishment of an encrypted tunnel between the said first and second entities.

According to a further aspect of embodiments of the present invention, the parameters used by the virtual private network "VPN" interfaces for the establishment of the connection comprise parameters of the traffic flow template "TFT" that allows identifying a type of bearer.

According to an additional aspect of embodiments of the present invention, the transport network is based on an Internet protocol "IP".

According to another aspect of embodiments of the present invention, the transport network uses a long term evolution "LTE" structure.

According to a further aspect of embodiments of the present invention, the first entity is a user equipment comprising a virtual private network "VPN" client interface and the second entity is an application function server or a list of application functions of the transport network accessible via a virtual private network "VPN" gateway interface.

According to an additional aspect of embodiments of the present invention, the bearer is a dynamic dedicated bearer so that upon request of a connection with the user equipment with a given quality of service "QoS", the application function server establishes a new bearer of the type corresponding to the requested quality of service "QoS" by sending a request to the policy and charging rules function "PCRF", the virtual private network "VPN" gateway acting as a proxy or a translator between the application function server and the policy and charging rules function "PCRF".

According to another aspect of embodiments of the present invention, the sending of a request to the policy and charging rules function "PCRF" is achieved using a third generation partnership project "3GPP" normalized Rx interface.

According to a further aspect of embodiments of the present invention, the bearer is established on a subscription base at the attachment of the user equipment through a mobility management entity "MME".

Embodiments of the present invention also refer to a user equipment of a transport network comprising a virtual private network "VPN" interface for establishing a connection with another entity of the virtual private network "VPN" and transmitting packets through the said connection wherein the said interface is configured for:
  selecting a bearer type among a plurality of types corresponding to different qualities of service "QoS" according to a requested quality of service "QoS",
  establishing a bearer of a selected type and,
  using global routing parameters corresponding to the global routing parameters used in the transport network for routing packets associated with the requested quality of service "QoS" to the established bearer wherein at least one of the said parameters is different from one bearer type to another.

According to a further aspect of embodiments of the present invention, the transport network is based on an Internet protocol "IP" and wherein the configuration is also for achieving the correspondence between the global routing parameters used in the transport network and the global routing'parameters used in the virtual private network "VPN".

According to another aspect of embodiments of the present invention, the user equipment is configured for establishing a connection on a long term evolution "LTE" structure.

Embodiments of the present invention also refer to an application server comprising a virtual private network "VPN" interface for establishing a connection with another entity of the virtual private network "VPN" in a transport network wherein the said interface is configured for:
  selecting a bearer type among a plurality of types corresponding to different qualities of service "QoS" according to a requested quality of service "QoS",
  establishing a bearer of a selected type and,
  using global routing parameters corresponding to the global routing parameters used in the transport network for routing the packets associated with the requested quality of service "QoS" to the established bearer wherein at least one of the said parameters is different from one bearer type to another.

According to a further aspect of embodiments of the present invention, the transport network is based on an Internet protocol "IP" and wherein the configuration is also for achieving the correspondence between the global routing parameters used in the transport network and the global routing parameters used in the virtual private network "VPN".

According to an additional aspect of embodiments of the present invention, the application server is configured for establishing a connection on a long term evolution "LTE" structure.

According to a further aspect of embodiments of the present invention, the virtual private network "VPN" interface comprises a virtual private network "VPN" gateway and a packet data network "PDN" gateway.

MORE DETAILED DESCRIPTION

Figure 1:
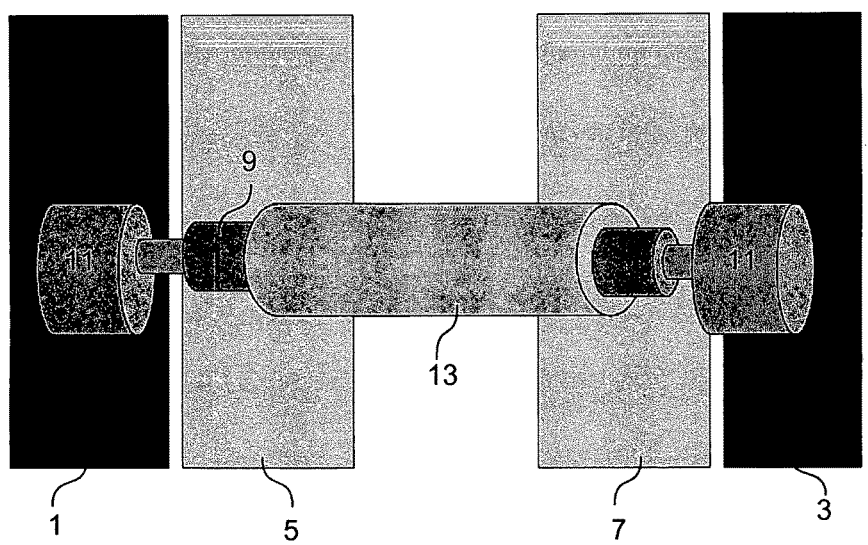
FIG. 1 is a diagram of a virtual private network established between two transport network entities.

As used herein, the term "QoS" refers to the acronym quality of service;

As used herein, the term "VPN" refers to the acronym virtual private network;

As used herein, the term "IP" refers to the acronym Internet protocol;

As used herein, the term "LTE" refers to the acronym long term evolution;

As used herein, the term "TFT" refers to the acronym traffic flow template;

As used herein, the term "PDN" refers to the acronym packet data network;

As used herein, the term "eNB" refers to the expression enhanced Node B or evolved Node B which correspond to base stations used in LTE networks;

As used herein, the term "PCRF" refers to the acronym policy and charging rules function;

As used herein the term "3GPP" refers to the acronym third generation partnership project;

As used herein, the term "RAN" refers to the acronym radio access network;

As used herein, the term "HSS" refers to the acronym home subscriber service;

As used herein, the term "PTT" refers to the acronym push-to-talk;

As used herein, the term "MME" refers to the acronym mobility management entity;

Embodiments of the present invention refer to the establishment, in a VPN, of global routing parameters corresponding to global routing parameters used in a transport network and the use of the said global routing parameters for the establishment of a dedicated bearer between the interfaces of a VPN 9 in order to allow QoS differentiation within the VPN 9.

In the following of the description, a VPN 9 is established between a first entity 1 and a second entity 3 over a LTE transport network wherein the first entity 1 is a VPN client 5 and the second entity 3 is a VPN gateway 7. However, embodiments of the invention can be applied to any VPN configuration as for example a VPN 9 established between two VPN clients 5 and over any transport network providing QoS differentiation capability.

Thus, in the present embodiment, the VPN client 5 is located in a user equipment 1 such as a cell phone and the VPN gateway 7 is located in an application server of the core network.

Figure 2:
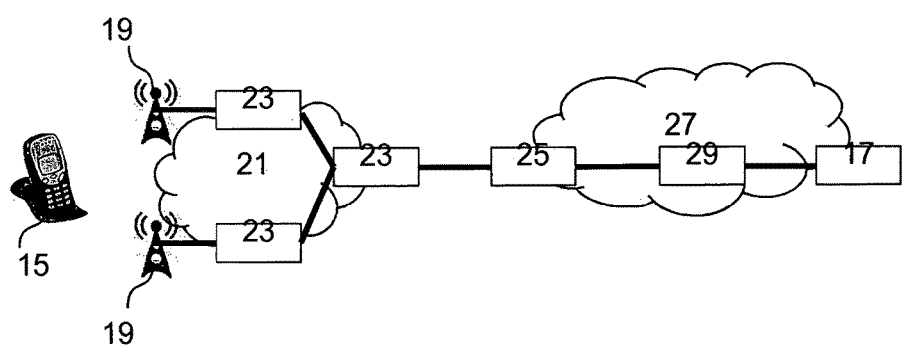
FIG. 2 is a diagram of a transport network infrastructure.

FIG. 2 represents an example of a transport network configuration based on an LTE network between a user equipment 15 and an application server 17. The user equipment 15 is connected through radio communication to an enhanced node B (eNB) 19. The eNBs 19 are linked to routers 23 of the backhaul 21 towards a serving gateway (SGW) 25 of the core network 27. The SGW is then linked to a PDN gateway (PGW) 29 which is itself linked to the application server 17. When a connection is established between the user equipment 15 and the application server 17 over the LTE network, different QoS are defined according to the application requested by the user of the user equipment 15. It has to be noted that in the case of a LTE network, the QoS is ensured from the user equipment 15 to the PGW 29. Different categories associated with different QoS are defined, for example conversational voice, conversational video, streaming video, email and chat . . . and a priority level is determined for each category. The priority level refers to the resources that need to be reserved for the connection to ensure a requested QoS for the application.

Indeed, a video streaming requires more resources than an e-mail application so that more resources are reserved for a video application. This resources reservation is achieved through the establishment of different types of bearers having different capacity or QoS. Thus, when a connection is established, the type of bearer used for the connection is selected according to the requested application in order to provide the necessary QoS while using only the resources that are necessary to ensure this QoS leading therefore to an optimization of the resources use.

Moreover, in the case of a connection through a VPN over a LTE network, additional parameters are necessary in order for the network entities linked by the VPN 9 to differentiate different types of bearers within the VPN 9. The set of parameters necessary for the establishment of a bearer and the routing of the data packets towards an established bearer need therefore to comprise at least one parameter which is different from one type of bearer to another so that the selected type of bearer be identified by the network entities, the user equipment 15 and the application server 17 in the present example.

Thus, global routing parameters, for example traffic flow template (TFT) parameters, are used for the establishment of the VPN 9. These TFT parameters comprise the IP destination address, the destination port, the IP source address, the source port and the protocol and correspond to global routing parameters used in the transport network. The packets destined to be transmitted by a determined bearer are therefore routing towards the selected bearer using the TFT parameters of the VPN and are transmitted by the said bearer through the VPN 9. Furthermore, other information like the information located in a differentiated service code point (DSCP) field or Audio type field may also be used by the VPN 9 in order to decide which QoS classification will be used and therefore to route the packets towards the selected bearer.

Figure 3:
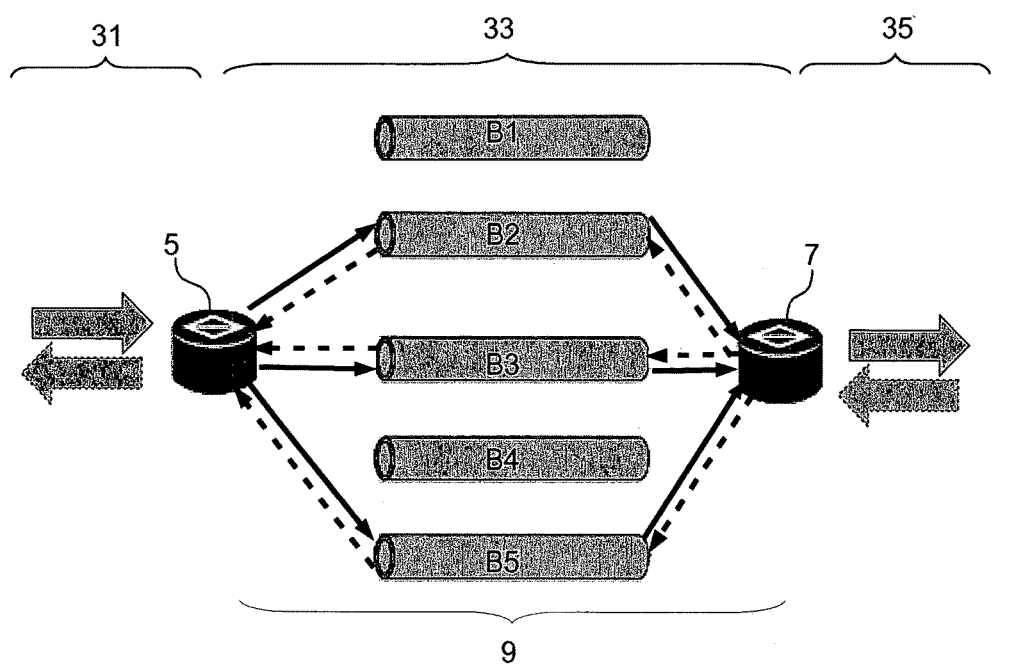
FIG. 3 is a diagram of a virtual private network with a plurality of different bearers according to an embodiment of the present invention.

FIG. 3 represents a diagram of the packet streams transmitted between the entities connected by a VPN 9 wherein the packet streams are represented by arrows. The dotted arrows correspond to the downlink traffic from the application server to the user equipment and the solid arrows correspond to the uplink traffic.

The traffic can be divided in three parts, a first part 31 at the user equipment level but outside of the VPN interface 5 which correspond to an aggregated traffic, a second part 33 in the VPN which corresponds to a splitted traffic and a third part 35 at the application server level but outside of the VPN interface or VPN gateway 7 which corresponds to an aggregated traffic.

Thus, for the downlink traffic, the aggregated packets are splitted at the VPN gateway 7 level according to their associated priority level to be routed towards one type of bearers among the different types B1, B2 . . . B5. The said bearers having a QoS corresponding to the predetermined priority levels. For example, the QoS associated with the bearer type B1 may correspond to the QoS requested for a video so that a packet associated with a video application and received at the VPN gateway will therefore be routed towards a bearer of the B1 type.

In order to achieve such splitting of the different packet streams, the VPN gateway 7 establishes TFT parameters within the VPN 9 and creates a translation mechanism between the TFT parameters used in the transport network and the TFT parameters of the VPN 9. The established TFT parameters of the VPN 9 are then used to discriminate the different types of bearer. As a consequence, at least one of the TFT parameters needs to be different from one type of bearers to the others. The VPN gateway and the PGW then routes the packets towards the dedicated type of bearers according to the priority associated with each packet using the TFT parameters of the VPN 9. The different bearers B1, B2 . . . B5 comprising the different packet streams are then received by the VPN client interface 5: The said VPN client interface 5 routes the packets towards their corresponding application in the user equipment 1 using their destination address. The required QoS for each packet stream being ensured by the translation and routing mechanisms using the TFT parameters established in the VPN gateway 7. In the same way, a translation mechanism is achieved at the VPN client interface 5 for the uplink traffic which is splitted, at the VPN client interface 5, in different packet streams according to the priority level associated with each packet. The different packet streams are then routed towards a dedicated bearer using the TFT parameters of the VPN 9 and the different packet streams are routed towards their destination at the VPN gateway 7. The QoS of each packet stream being ensured by the translation and routing mechanism achieved in the VPN client interface.

Thus, for the downlink traffic, the TFT parameters of the transport network are used in the VPN gateway to establish corresponding TFT parameters used in the VPN which allow ensuring that the QoS provided through the VPN corresponds to the QoS defined in the TFT parameters of the transport network.

Similarly, for the uplink traffic, the TFT parameters of the transport network are used in the VPN client interface to establish corresponding TFT parameters used in the VPN which allow ensuring that the QoS provided through the VPN corresponds to the QoS defined in the TFT parameters of the transport network.

Furthermore, two configurations of bearers can be established:

According to a first embodiment, the bearers are dynamic dedicated bearers and are established by an application function of the application server upon request from the user equipment. For example, a request is sent by the user equipment for a video application. The QoS associated with this application is then determined by the application function. The application function then sends a request to establish a new bearer of the determined QoS to the policy and charging rules function (PCRF) through a 3GPP Rx interface or a radius interface. The request transits through the VPN gateway which acts either as a proxy or as a translator. In both cases, the VPN gateway "translates" the different routing parameters. The applied translation rules being in agreement with the rules used for the control plan to route the packet streams. Thus, in this embodiment, the dedicated bearers are established on demand.

According to another embodiment, the bearers are subscription base bearers which are established at the attachment of the user equipment on a subscription base. In this case, the bearers are established by a radio access network (RAN) entity, the mobility management entity in the case of a LTE network. In this embodiment, the rules pre-established in the RAN and/or the home subscriber service (HSS) use several VPN addresses and ports which must be in agreement with the addresses and ports preconfigured and used in the VPN. Thus, in this embodiment, the dedicated bearers are established on subscription base at the attachment of the user equipment. Both configurations of bearers allow QoS differentiation in combination with a VPN.

Figure 4:
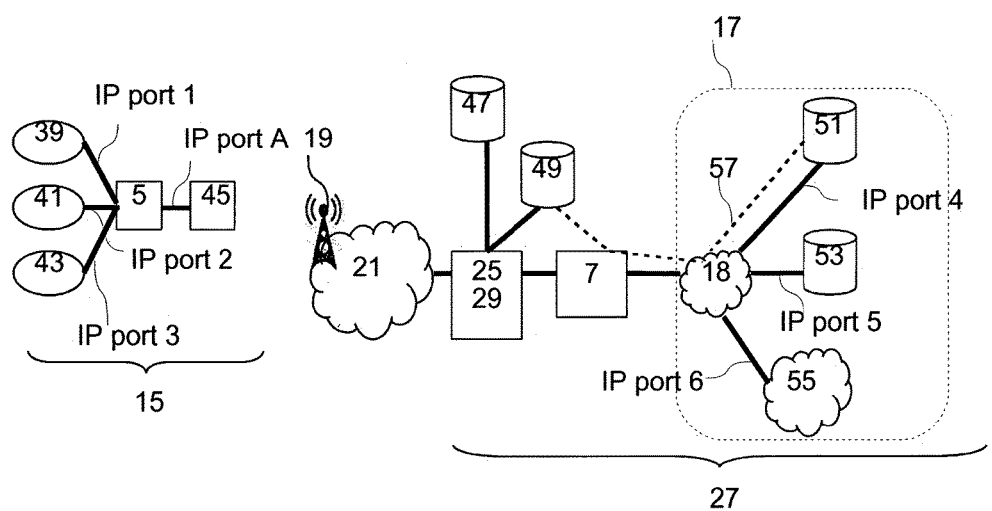
FIG. 4 is a diagram of the different entities of a user equipment and a core network.

In order to better understand, an example will now be described based on FIG. 4. In this example, the bearers are dynamic dedicated bearers.

The user equipment 15 has three communication applications, a video client application 39 linked to the IP port 1, a push-to-talk (PTT) application 41 linked to the IP port 2 and a browser application 43 linked to the IP port 3. The three ports are linked to the VPN client interface 5 which is linked to a LTE modem 45 through IP port A. This LTE modem 45 allows attachment of the user equipment to an enhanced node B (eNB) 19 which is linked to Serving 25 and PDN 29 gateways (SGW and PGW) through a backhaul 21. The SGW 25 and PGW 29 are linked to a mobility management entity (MME) 47, a policy and charging rules function (PCRF) 49 and a VPN gateway 7 comprising three IP ports B, C and D. The VPN gateway is linked to the application server 17 which comprises three application functions corresponding to the applications of the user equipment: a video application function 51, a PTT application function 53 and an Internet application function 55. The application functions are linked respectively by IP ports 4, 5 and 6 via an interconnection 18.

When a user of the user equipment 15 starts an application, for example a video application 39, a request is sent to the video application 51 of the application server 17. The request comprises the address of the video application 39 in the user equipment 1, which refers to the IP address of the user equipment 15 and port 1 of the user equipment 15 in the present case noted IP UE port 1, which will be the destination address for the video packets sent from the video application 51 of the application server 17. The application server 17 and the video application 51 receive the request from the user equipment 15 and send to the PCRF 49 a request to establish a bearer from IP address of the application server and port 4 of the application server noted IP AS port 4, which is the address of the video application function 51 to the IP UE port 1 which is the address of the video application 39 in the user equipment 15. This request is transmitted through the VPN gateway 7 using a Rx interface 57. The VPN gateway 7 acts as a proxy or a translator and translates the request to send it to the PCRF 49. With this translation, the request of a connection between IP AS port 4 and IP UE port 1 is translated in a request of a connection between IP AS port B and IP UE port A on a bearer having a QoS corresponding to a video application priority level. Such translation is achieved using the TFT parameters transmitted by the application server through the transport network and introducing corresponding TFT parameters in the VPN, the said corresponding TFT parameters being transmitted to the PCRF and interpreted by the PCRF to establish a bearer having the required QoS.

The PCRF 49 then triggers the establishment of a bearer comprising resources to provide the required QoS for a video application through the VPN. The VPN is established using IP AS port B as source address and IP UE port A as destination address instead of using IP AS port 4 and IP UE port 1. After establishment of the bearer, data packets are sent from the video application 51 (address IP AS port 4) of the application server 17 towards the video application 39 of the user equipment 15 (address IP UE port 1). These packets are received by the VPN gateway wherein they are encapsulated within the VPN. Using the TFT parameters received by the application server 17, the VPN identifies the received packet stream and uses IP source and destination addresses IP associated to the identified packet stream. This is true for both directions (uplink and downlink). The streams that are not identified are transmitted using a default bearer with default source and destination IP addresses. Within the VPN, the PGW 29 uses the global routing parameters provided by the VPN gateway, the translated TFT parameters, to select the relevant bearer and to ensure the requested QoS at destination. Indeed, the corresponding TFT parameters provided by the VPN gateway arc transmitted with the data packets and the PGW route the packets towards a bearer according to these TFT parameters. Thus, when the VPN client interface 5 receives the packets, from the video application function 51, the VPN client interface 5 route these packets towards the video application 39 of the user equipment 1 and the requested QoS can be ensured to the user due to the selection of bearer type achieved at the PGW using the TFT parameters of the VPN provided by the VPN gateway.

To sum up, the VPN gateway acts as a translator to provide VPN TFT parameters corresponding to the TFT parameters transmitted by the transport network. The said VPN parameters are transmitted on one band to the PCRF to establish a dedicated bearer having the required QOS with respect to the selected application and on the other hand with the transmitted packets associated to the selected application in order for the PGW to route the said transmitted packets towards the bearer established for this application.

Furthermore, with dynamic bearers, at the end of the transmission of all the packets corresponding to the requested video, the resources used by the bearer are freed for other applications and/or other users, the information of the end of the packet stream transmission being sent by the corresponding application of the application server 17 (the video application 51 in the present case) using a dedicated Rx message.

Thus, the use of corresponding global routing parameters, such as TFT parameters, at the VPN interfaces allows establishing different types of bearers having different QoS and routing the data packets towards a selected type of bearers. Such QoS differentiation allows therefore managing multiple IP ports for the same user equipment. The combination of the features of a VPN and the features of transport network having QoS differentiation capability provides a secured connection while optimizing the resources use and ensuring a predetermined QoS to the users.

The invention claimed is:

1. A method for establishing a connection through a virtual private network "VPN" over a long term evolution "LTE"-based transport network, between a User Equipment and an application function server comprising:
   establishing a bearer between a VPN interface of said User Equipment and a VPN gateway of said application function server, said bearer being of a type corresponding to a quality of service "QoS" required for said connection; and
   associating packets of said connection with said established bearer based on at least one parameter, the at least one parameter comprising a translated traffic flow template "TFT" parameter obtained by translating a TFT parameter used in said transport network into a corresponding TFT parameter used in said VPN;
   wherein:
   the bearer is a dynamic dedicated bearer;
   the VPN gateway of the application function server acts as a proxy or a translator between said application function server and a policy and charging rules function "PCRF" for establishment of said dedicated bearer.

2. The method in accordance with claim 1, further comprising transmitting said translated TFT parameter with said packets.

3. The method in accordance with claim 1 wherein said translated TFT parameter comprises IP addressing information.

4. A virtual private network "VPN" gateway of an application function server including one or more processors in communication with a memory, said VPN gateway configured to:
   support establishing a connection through a VPN over a long term evolution "LTE"-based transport network between a User Equipment and said application function server;
   support establishing a bearer between a VPN interface of said User Equipment and said VPN gateway, said bearer being of a type corresponding to a quality of service "QoS" required for said connection;

support associating packets of said connection with said established bearer based on at least one parameter, the at least one parameter comprising a translated traffic flow template "TFT" parameter obtained by translating a TFT parameter used in said transport network into a corresponding TFT parameter used in said VPN; and act as a proxy or a translator between said application function server and a policy and charging rules function "PCRF", for establishment of a dedicated bearer.

5. The VPN gateway in accordance with claim 4, configured to support transmission of said translated TFT parameter with said packets.

6. The VPN gateway in accordance with claim 4, wherein translated TFT parameter comprises IP addressing information.

* * * * *